J. WILKINSON.
CARBURETER.
APPLICATION FILED AUG. 18, 1902.

1,038,699.

Patented Sept. 17, 1912.

WITNESSES:
Chas. J. Foner.
Chas. Young.

INVENTOR
John Wilkinson
BY
Fry & Parsons
ATTORNEYS

UNITED STATES PATENT OFFICE.

JOHN WILKINSON, OF SYRACUSE, NEW YORK, ASSIGNOR TO H. H. FRANKLIN MANUFACTURING COMPANY, OF SYRACUSE, NEW YORK, A CORPORATION OF NEW YORK.

CARBURETER.

1,038,699.

Specification of Letters Patent. Patented Sept. 17, 1912.

Application filed August 18, 1902. Serial No. 120,058.

*To all whom it may concern:*

Be it known that I, JOHN WILKINSON, of Syracuse, in the county of Onondaga and State of New York, have invented a certain new and useful Carbureter, of which the following is a specification.

My invention has for its object the production of a carbureter which is particularly practical, durable and effective; and to this end, it consists in the novel combinations and constructions hereinafter set forth and pointed out in the claims.

In describing this invention, reference is had to the accompanying drawing in which like characters designate corresponding parts in all the views.

Figure 1:
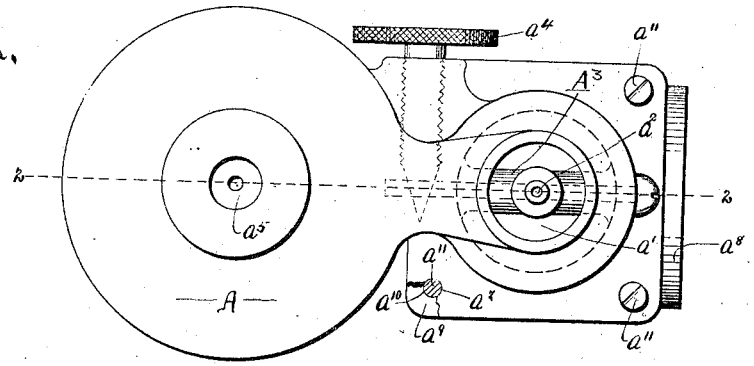
Figure 2:
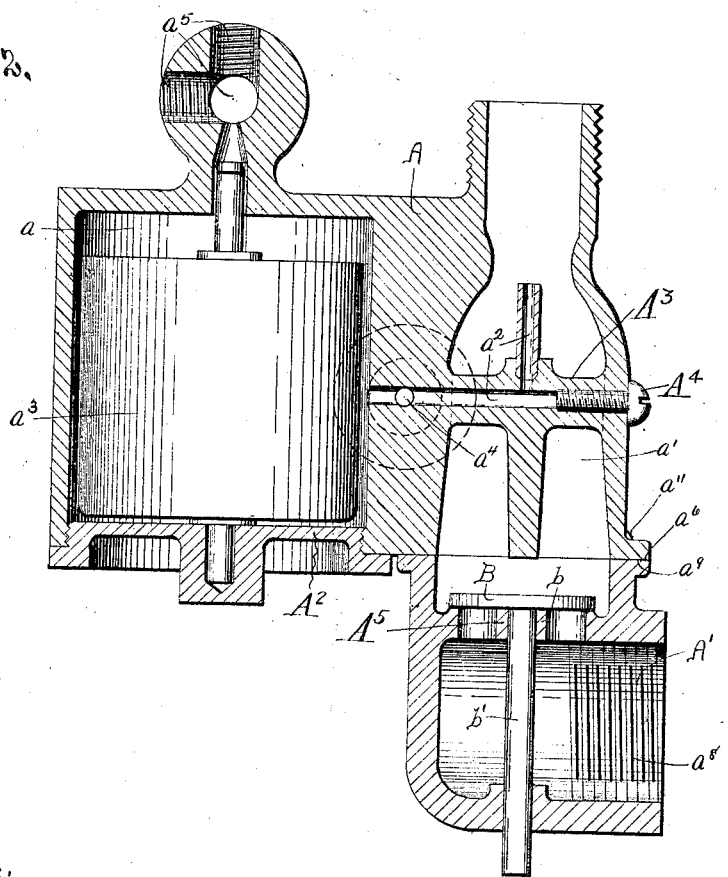

Figure 1 is a top plan, partly in section, of a preferable embodiment of my carbureter. Fig. 2 is a vertical sectional view taken on line 2—2, Fig. 1.

A represents the casing or main frame of my carbureter, and A' the conduit for conducting air thereto. Said casing A is provided with a supply or reservoir-chamber $a$ in which the hydrocarbon is maintained at a substantially constant level, a conduit $a'$ for the passage of air, and a feed-duct $a^2$ connecting the parts $a$, $a'$. As illustrated, the reservoir-chamber $a$ is formed in one side of the casing A and is provided with an open end closed by a suitable detachable head $A^2$; the conduit $a'$, which forms the mixing chamber of the carbureter, extends through the casing A at one side of the chamber $a$, is formed with a portion of less size or cross-sectional area than the remaining portion of the mixing chamber for causing the flow of air passing through the reduced portion of the mixing chamber to insure the taking up of the hydrocarbon vapor and contains an integral bridge-piece $A^3$ arranged crosswise thereof and formed of less width than the diameter of said conduit $a'$. The duct $a^2$ extends from the reservoir-chamber $a$ substantially transversely of the axis of the conduit $a'$ through the bridge-piece $A^3$ and the outer surface of the casing A, and is provided with a lateral unobstructed part or branch extending upwardly within the conduit or mixing chamber $a'$ to a point above the level of the hydrocarbon in the chamber $a$, the exit of this upwardly extending branch opening into the portion of less size of the mixing chamber. Any desirable plug $A^4$ closes the end of the duct $a^2$ opening through the outer surface of the casing A.

The hydrocarbon maintained at a substantially constant level in the supply or reservoir-chamber $a$ flows freely through the feed-duct $a^2$ subject to control by a valve $a^4$, presently described, and rises in the upwardly extending part of said duct to substantially the level of the hydrocarbon in the chamber $a$. It is therefore apparent that a substantially constant level of hydrocarbon is present within the vertical part of the feed-duct $a^2$ in unobstructed communication with the conduit or mixing chamber $a'$, and that the hydrocarbon within the duct $a^2$ is constantly replenished by a reservoir in open communication with said duct $a^2$ when the valve $a^4$ is open. A constant and ample supply of hydrocarbon to the mixing chamber is thus provided which augments materially the efficiency of the carbureter.

In the illustrated embodiment of my invention the hydrocarbon is maintained at a substantially constant level in the supply or reservoir-chamber $a$ by a suitable float-valve $a^3$ within said chamber. A normally-fixed and adjustable valve $a^4$ is also provided in the duct $a^2$ intermediate of the chamber $a$ and the vertical part or branch of the duct $a^2$ for controlling or preventing the flow of the hydrocarbon through said duct.

Hydrocarbon is generally admitted to the chamber $a$ by a series of passages $a^5$ which are arranged at an angle to each other, communicate at corresponding ends with the chamber $a$, and open at their opposite ends with the outer surface of the casing A. Inlet-passages, arranged as described, permit the read connection to the casing A of a hydrocarbon-inlet pipe extending toward the same in any one of a number of different directions, and the inlet-passages not connected to said pipe may be closed by any desirable removable plugs and may be used to facilitate cleaning of the passage to the chamber $a$.

In the preferable construction of my invention, the casing A is provided with a substantially square flat surface $a^6$ surrounding the inlet of the conduit $a'$, and with substantially equidistant openings $a^7$ at the corners of the surface $a^6$.

The conduit A' with the conduit $a'$ form the complete air-conduit for the carbureter, and although said conduit A' is usually separable from the casing A, it may obviously be integral therewith, if desired. Said conduit A' is here illustrated as provided with a laterally-extending inlet-branch $a^8$, a substantially square flat surface $a^9$ surrounding the exit of said conduit A' and normally opposed to the surface $a^6$ of the casing A, and substantially equidistant openings $a^{10}$ at the corners of the surface $a^9$. These openings $a^{10}$ are alined with the openings $a^7$ when the conduit A' is arranged in its normal position with its branch $a^8$ extending to one side, or the front, or the rear of the casing A, and normally receive suitable fastening means, as screws $a^{11}$, also received in the openings $a^7$.

My carbureter is preferably provided with a gravity-seating valve B which controls the passage of the air through the complete conduit $a'$ A'. Said valve B normally prevents the entrance of air through the air-inlet conduit A' to the conduit or mixing chamber $a'$, and its weight is so proportioned to the vacuum required to take up or lift an amount of hydrocarbon from the feed-duct sufficient to provide a minimum charge, that the valve will remain upon its seat and prevent the entrance of air until said vacuum is attained in the mixing chamber. It thus follows that no air is admitted to the mixing chamber of the carbureter, until a sufficient vacuum is created within such chamber to raise the valve B from its seat, and that this vacuum determines the weight of the valve B and is sufficient to draw or lift from the hydrocarbon supplied to the mixing chamber, the minimum amount of vapor to unite with the air admitted by the valve B, to form an explosive mixture. Moreover, as the valve B is seated by gravity, the operation thereof is always uniform and the passage of the air upon the opening of the valve is unrestricted to a maximum extent, which would not be the case were said valve seated by a spring, since springs are more or less ununiform in operation, especially when vacuums of different degrees are produced in the mixing chamber, and also in returning the valves cause the same to unduly restrict the passage of the air. To those skilled in the art it will be apparent that the valve B having its weight proportioned, as described, adds materially to the efficiency of my carbureter, especially when the engine equipped therewith is throttled or turned by hand, since ordinarily in such event the speed of the air is so slight that sufficient hydrocarbon is not drawn into the engine by the air to make an explosive mixture, whereas in my carbureter no air is admitted to the mixing chamber thereof until a vacuum is produced in this chamber which is sufficient to give such speed to the air that the hydrocarbon taken up therewith will make an explosive charge. Although the valve B operates, as described, when but a minimum quantity of air is passing, the resistance of this valve is so slight that it is of no material effect when the engine is not throttled and the normal quantity of air is passing.

In the illustrated embodiment of my invention, the valve B is movable in the conduit A' below the point of communication of the feed-duct $a^2$ with the conduit $a'$ and between a lug depending from the bridge-piece $A^3$ and a partition $A^5$, which latter extends transversely in the upper end of the conduit A' and is provided with the seat $b$ for the valve B. A suitable stem $b'$ projects from the valve B through the partition $A^5$ and the wall of the conduit A' for guiding said valve in its movement and permitting hand-manipulation thereof.

The valve B, formed and arranged as described, is particularly efficient, but it will be understood that I do not limit said valve to the described form or arrangement, and that if desired it may be of greater weight than is required to insure, before the lifting thereof, the production of a vacuum in the mixing chamber sufficient to cause the air passing when the valve is open, to take up the minimum amount of vapor sufficient to make an explosive mixture.

The construction and operation of my carbureter will now be readily understood upon reference to the foregoing description and the accompanying drawing, and it will be obvious that more or less change may be made in the component parts of said carbureter without departing from the spirit of my invention.

Having thus described my invention, what I claim is:—

1. In a carbureter, the combination of a mixing chamber, means for maintaining a substantially constant level of hydrocarbon within the chamber and for exposing the upper surface of said hydrocarbon within the chamber, a conduit communicating with the mixing chamber for admitting air thereto, and a gravity-seating valve for controlling the passage of air through the conduit, said valve having its weight so proportioned to the vacuum required to take up an amount of hydrocarbon sufficient to provide a minimum operative charge, that the valve will remain upon its seat until said vacuum is attained in the mixing chamber, substantially as and for the purpose described.

2. In a carbureter, the combination of a mixing chamber, a hydrocarbon reservoir-chamber, a feed-duct leading from the latter and communicating with the mixing chamber, said feed-duct having substantially the same level of hydrocarbon therein as in the reservoir-chamber, and being normally open to permit the passage of the hydrocarbon therethrough, and having an exit-opening within the mixing chamber for exposing within said chamber the upper surface of the level of hydrocarbon within the feed-duct, a float-valve within the reservoir-chamber for controlling the admission of the hydrocarbon thereto and maintaining a substantially constant level of hydrocarbon within the reservoir-chamber, a conduit communicating with the mixing chamber for admitting air thereto, and a gravity-seating valve for controlling the passage of air through the conduit, said valve having its weight so proportioned to the vacuum required to take up an amount of hydrocarbon sufficient to provide a minimum operative charge, that the valve will remain upon its seat until said vacuum is attained in the mixing chamber, substantially as and for the purpose set forth.

3. In a carbureter, the combination of a mixing chamber having a portion of less size than the remaining portion of such chamber, a feed-duct having a part thereof vertically disposed within the mixing chamber and opening directly thereinto, the exit of the feed-duct opening into the portion of less size of the mixing chamber and being normally open to permit the passage of the hydrocarbon therethrough, a hydrocarbon-supply connected to the feed-duct and including means for maintaining a substantially constant level of hydrocarbon in said vertically-disposed part of the feed-duct below the opening therein into the mixing chamber, an air-inlet to the mixing chamber below the opening of said vertically-disposed part of the feed-duct, and a valve for closing and controlling the air-inlet, substantially as and for the purpose described.

4. In a carbureter, the combination of a mixing chamber having a portion of less size than the remaining portion of such chamber, a feed-duct having a part thereof vertically disposed within the mixing chamber and opening at its upper end directly thereinto, the exit of the feed-duct opening into the portion of less size of the mixing chamber, and being normally open to permit the passage of the hydrcarbon therethrough, a hydrocarbon-supply comprising a reservoir-chamber connected to the feed-duct, and a float-valve within the reservoir-chamber for controlling the admission of the hydrocarbon to the reservoir-chamber and thereby maintaining a constant level of the hydrocarbon in the feed-duct and the reservoir-chamber, a normally-fixed valve for controlling the flow through the feed-duct arranged intermediate of the vertically-disposed part of the latter and the reservoir-chamber, an air-inlet to the mixing chamber below the opening of said vertically-disposed part of the feed-duct, and a gravity-seating valve for controlling the passage of air through the air-inlet, said valve having its weight so proportioned to the vacuum required to take up an amount of hydrocarbon sufficient to provide a minimum operative charge, that the valve will remain upon its seat until said vacuum is attained in the mixing chamber, substantially as and for the purpose set forth.

5. In a carbureter, the combination of a casing having a conduit for the passage of the air and a feed-duct for the hydrocarbon discharging into the conduit, said casing being provided with a substantially square surface surrounding the inlet of the conduit and with substantially equidistant openings at the corners of said surface, a second conduit for communicating with the former conduit having a laterally-extending branch, said second conduit being provided with a substantially square surface surrounding its exit and opposed to the former substantially square surface, and with substantially equidistant openings at the corners of said surface alined with the former openings when the second conduit is arranged with its branch extending to one side, or the front, or the rear of the frame, and fastening means passed through said openings, substantially as and for the purpose set forth.

6. In a casing for a carbureter, the combination of a chamber for receiving the hydrocarbon, a plurality of inlet-openings arranged at an angle to each other, corresponding ends of the inlet-openings communicating with the chamber and their opposite ends opening through the outer surface of the frame for permitting the connection to the carbureter of a hydrocarbon inlet-pipe extending toward the carbureter in any one of a number of different directions, and plugs for closing the inlet-openings not communicating with said inlet-pipe.

In testimony whereof, I have hereunto signed my name in the presence of two attesting witnesses, at Syracuse, in the county of Onondaga, in the State of New York, this 12th day of August, 1902.

JOHN WILKINSON.

Witnesses:
 S. Davis,
 F. G. Bodell.

---

Copies of this patent may be obtained for five cents each, by addressing the "Commissioner of Patents, Washington, D. C."